(12) United States Patent
Handa et al.

(10) Patent No.: US 6,769,230 B2
(45) Date of Patent: Aug. 3, 2004

(54) COLLECTIVE AND CENTRALIZED INVENTORY STORING METHOD OF SHEET METAL PARTS FOR REPAIRING

(75) Inventors: Akira Handa, Tokyo (JP); Kenji Yoshikawa, Tokyo (JP); Masato Noshiro, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/209,275

(22) Filed: Aug. 1, 2002

(65) Prior Publication Data

US 2003/0039533 A1 Feb. 27, 2003

(30) Foreign Application Priority Data

Aug. 1, 2001 (JP) ........................................ 2001-233771

(51) Int. Cl.[7] ............................ B65B 11/48; B65B 11/00
(52) U.S. Cl. ............................ 53/461; 53/441; 53/447; 53/428
(58) Field of Search .......................... 53/400, 402, 428, 53/474, 461, 441, 447

(56) References Cited

U.S. PATENT DOCUMENTS

| | | | | |
|---|---|---|---|---|
| 2,097,847 A | * | 11/1937 | Strauch ........................ | 53/402 |
| 2,811,252 A | * | 10/1957 | Bachtel ..................... | 206/524.4 |
| 2,996,351 A | * | 8/1961 | Strobe ........................... | 422/7 |
| 3,531,414 A | * | 9/1970 | Randell et al. ................. | 422/8 |
| 4,124,549 A | * | 11/1978 | Hashiudo et al. ............ | 524/563 |
| 4,374,174 A | * | 2/1983 | Stricklin et al. ............. | 428/341 |
| 5,799,463 A | * | 9/1998 | Kashiba ........................ | 53/400 |
| 5,840,381 A | * | 11/1998 | Ohtsuka ..................... | 428/34.4 |
| 6,006,638 A | * | 12/1999 | Eltringham ..................... | 83/86 |
| 6,412,628 B1 | * | 7/2002 | Tramposch .................. | 206/207 |

FOREIGN PATENT DOCUMENTS

| | | | | |
|---|---|---|---|---|
| JP | | 6-43750 U | 6/1994 | |
| JP | | 4090 39907 A | * 2/1997 | ........... B65B/25/14 |

OTHER PUBLICATIONS

Hiroyuki Hirano, "Zusetu MRP Yogo 500 Sen Anata nimo Seisan Kanri ga Hanasemasu<" The Nikkan Kogyo Shin-bun, Ltd., May 15, 1997, p. 168.
Ikuo Honma, "Materials Management," Maruzen Co., Ltd., Apr. 15, 1992, pp. 194–197.

* cited by examiner

Primary Examiner—Rinaldi I. Rada
Assistant Examiner—Gloria R Weeks
(74) Attorney, Agent, or Firm—Birch, Stewart, Kolasch & Birch, LLP

(57) ABSTRACT

A plurality of trimmed products 5, pressed-finished products 6, sub-component products 7 or the like which are pre-coating stages of sheet metal parts are put on top of each other as semi-finished products and collectively packed by a rust-preventive sheet 12 to provide a collective style of packing for collective storage 10. This collective packing style for collective storage 10 is stored as one packing unit. Operation timing of the collective storage is when the forecasted number of demand reaches a predetermined number, for example, when cubic volume of a metal die coincides with cubic volume for storing all quantity of the semi-finished products to be stocked. At this point, all quantity of the semi-finished products of which the demand is forecasted are collectively manufactured and stored as a stock, wherein the metal die is scrapped.

6 Claims, 6 Drawing Sheets

A: CONVENTIONAL PACKING STYLE

PACKING STYLE OR SALE/PACKING STYLE FOR STOAGE PER PIECE

2 STORED IN RACK WAREHOUSE

B: PACKING STYLE OF THE PRESENT INVENTION

STAIN/RUST-PREVENTIVE PACKING

3 TO 50 TIMES

CONTAINER UNIT FOR CONVEYANCE

ONE PACKAGE (PLURALITY OF SHEET METALS)

COLLECTIVE AND CENTRALIZED INVENTORY STORING METHOD OF SHEET METAL PARTS FOR REPAIRING

BACKGROUND OF THE INVENTION

1. Field of the Invention

The present invention relates to a favorable collective and centralized inventory storing method for sheet metal parts such as sheet metal repair parts for automobiles which are required to store for a long time.

2. Description of the Prior Art

When the semi-finished products etc. available for daily production are stocked, there is not caused a big problem in storage and inventory management because the number of days for storage is several days at the longest. One example of such an inventory management for the semi-finished products for a short period of time is known and disclosed in Japanese Unexamined Utility Model Publication No. HEI 6-43750 (1994). However, in the case where repair parts have a predetermined deadline for storing and they are comparatively large sheet metal parts, the situation is quite different from the above.

Figure 1:
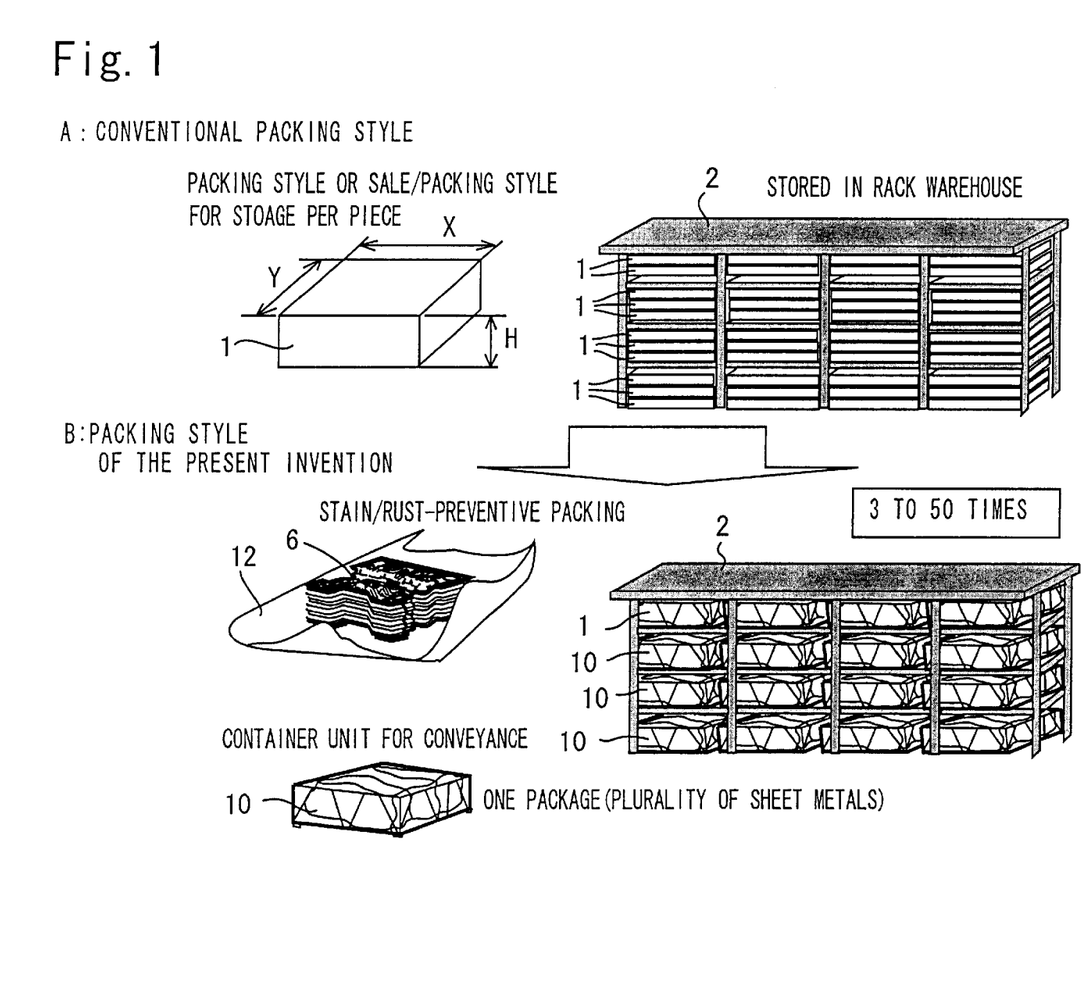
FIG. 1 is a view showing a style of packing for sheet metal repair parts in storage together with a conventional packing style.

Shown in the upper section A of FIG. 1 is a conventional storing method of a sheet metal parts for repairing of this kind such as a rear floor panel corresponding to a rear outside sheet of automobiles. Each rear floor panel which is a finished product provided with predetermined processes such as press working and coating is packed to provide a style of packing for sale 1 which is then stored in a storage-rack 2 one by one, then in a warehouse. Each size of height (Y), width (X) and thickness (H) in this packing style for the finished product for sale 1 is comparatively large. Inventory adjustment of the sheet metal parts for repairing are made based on the predetermined demand forecasting and even though production of the automobile has been ended, the sheet metal parts for repairing are required to store and supply for a predetermined period of time after that.

Figure 2:
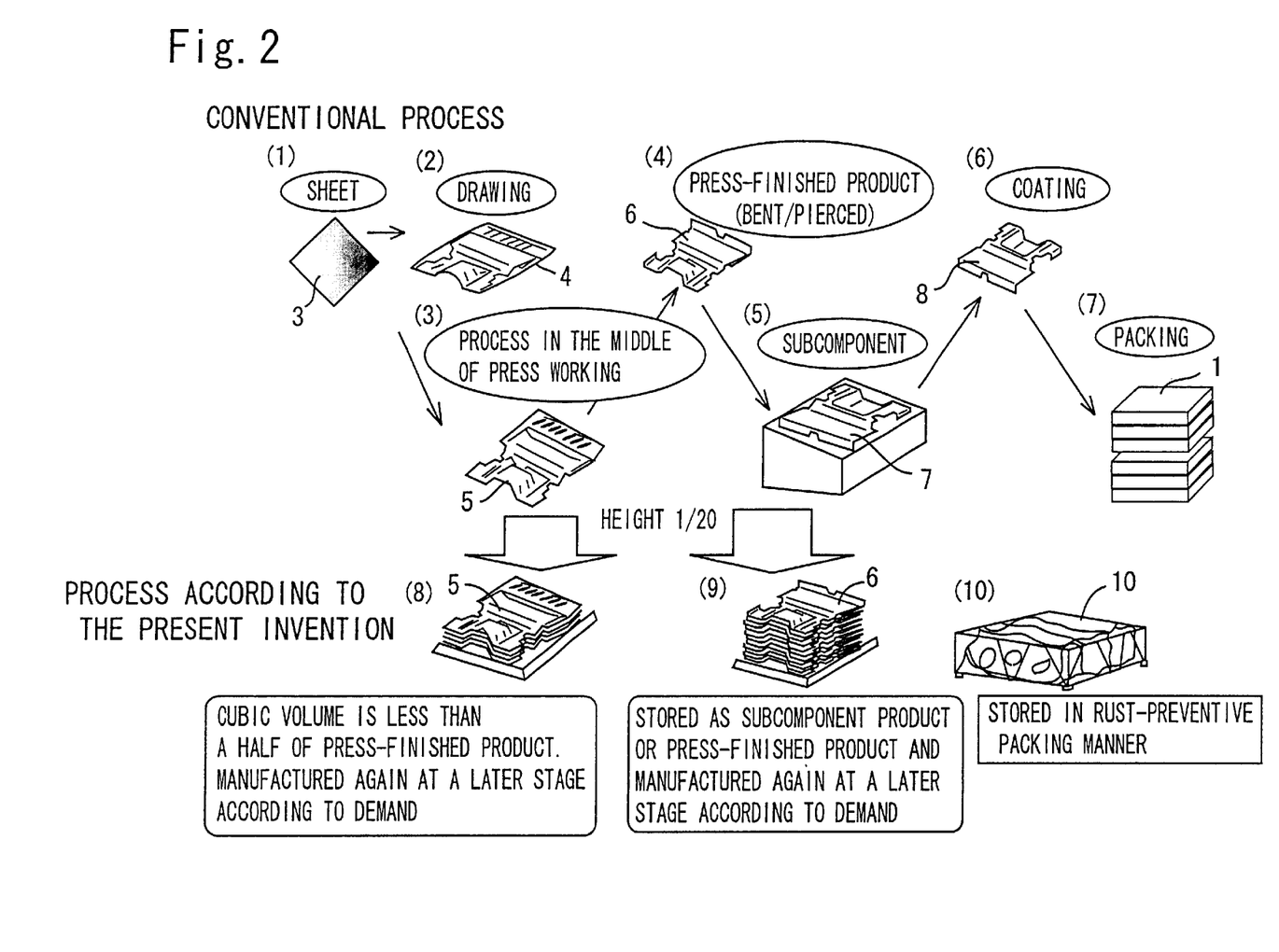
FIG. 2 is a view showing production through packing processes together with conventional ones.

The upper section of FIG. 2 shows each process of production to storage of the sheet metal parts in the conventional example. First, an original sheet 3 is prepared (process (1)) and then drawn to a certain shape to provide a drawn part 4 (process (2)). The drawn part is further processed to have a concavo-convex shape thereon and trimmed to provide a trimmed product 5 (process (3)). The trimmed product 5 is bent or the predetermined area thereof is pierced to provide a press-finished product 6 (process (4)). Press working is completed by this process (4). Then, small parts etc. are integrally welded to the press-finished product 6 to provide a sub-component product 7 (process (5)). The sub-component product 7 is then coated to obtain a finished product 8 (process (6)) which is then packed one by one to provide a packing style for the finished product 1 (process (7)). The sheet metal parts are manufactured in a small lot according to the situation of inventory and thus, the inventory is adjusted.

In the conventional example, since the sheet metal parts are stored in a packing style for the finished product 1, much space for storage is required and storage costs increase. In particular, since the sheet metal parts such as the outside sheet for automobiles have an inclination to become larger, the storage costs increase accordingly. Since the sheet metal parts are continuously manufactured many times in a small lot according to the stock condition, production costs also increase.

Further, to supply the sheet metal parts for a long time by such an intermittent production, it is necessary to store the metal die for the whole period time. As a result, the storage cost for the metal die, the rust-preventive expenses, maintenance costs and the like generate and these are also primary factors for increase in costs for inventory storage. Still further, if the sheet metal parts are large, the production site is naturally limited to a large factory which can own a large metal die for producing such a large part. It is therefore difficult for a comparatively small factory to take such a mobile action as to produce the parts in a small lot.

SUMMARY OF THE INVENTION

It is therefore an object of the present invention to provide an efficient inventory storing method for such sheet metal parts for repairing.

To solve the above-mentioned problems, a collective and centralized inventory storing method of sheet metal repair parts according to the present invention is provided, in which the sheet metal repair parts are made from a sheet shaped member through each process of drawing, press working, welding and coating, characterized in that when the forecasted number of demand is lower than a predetermined set value, a plurality of sheet metal parts are collectively enclosed by a rust-preventive sheet in a semi-finished product condition at least before coating to store them as one package, and a metal die is abandoned.

In this case, the predetermined set value in the forecasted number of demand can be the value in the case where packing volume of the semi-finished products to be collectively stored coincides with the cubic volume of the metal die, and in the case where an amount for storing the packed parts coincides with an amount for storing the metal die.

Further, the semi-finished product to be stocked can be either the trimmed product in the middle of press working or the sub-component product obtained by integrally forming other parts with the press-finished product. Structure of the sub-component product can be either the product obtained by integrally welding other parts to the press-finished product or the product obtained by integrally combining other parts with the press-finished product or the semi-finished product (hereinafter referred to as "combination") so that they can be stored together.

According to the present invention, when the forecasted number of demand reaches a predetermined set value, the sheet metal parts for repairing are collectively manufactured as the semi-finished product, and a plurality of finished products are packed and stored as one unit. In this manner, space for storage can be remarkably reduced. Further, since the metal die is abandoned at the same time, it is no more necessary to store the metal die for a long time and as a result, increase in costs can be avoided.

The collectively stored semi-finished products can be additionally processed at a later stage according to a demand and supplied as the finished product in the necessary quantity. Since the semi-finished product is not provided with coating, necessary color coating can be applied thereto according to a demand and it is possible to flexibly cope with the difference in the number of demand every color. It is also possible to keep the coating of the semi-finished product free from any damage. The inventory of which the storage deadline has expired can be abandoned in the semi-finished product condition. Accordingly, the cost resulting from the abandonment can be saved because processes to the finished product have been omitted.

If the predetermined set value in the forecasted number of demand is the value in the case where the packing volume of the semi-finished product to be collectively stored coincides with the cubic volume of the metal die, even though the semi-finished products are stored for a predetermined long period of time after that, it is possible to make the storage space minimal by abandoning the metal die because the storage space for the abandoned metal die can be appropriated for the semi-finished product. It is also possible to make the inventory storage of the sheet metal parts for repairing advantageous for a long period of time.

Further, the semi-finished product to be stocked can be either the trimmed product in the middle of press working process, the press-finished product or the sub-component product obtained by welding other parts to the press-finished product. In the case of the trimmed product, it is possible to make the storage space minimal because the cubic volume per piece is minimal. In the case of the press-finished product, the cubic volume becomes larger than that of the trimmed product, but since the process which requires a large press machine is completed, the processing place is not limited thereafter and it is possible to provide the mobile processing. Further, in the case of the sub-component product, although the cubic volume is maximum, it is integrally formed with the other parts by welding or combination storage. Accordingly, it is no more necessary to separately stock the assembled parts (including the metal die depending on the cases) and it is advantageous in parts management and inventory storage.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

A method for storing a rear panel for automobiles which is sheet metal part for repairing will now be described with reference to the accompanying drawings. As shown in the lower section of FIG. 2, according to the present invention, a plurality of trimmed products 5 which are processed panels in a stage (a step (3)) before press working are put on top of each other to provide one packing (a step (8)) or a plurality of press-finished products 6 or sub-component products 7 are put on top of each other to provide one packing (a step (9)). In this case, since the trimmed product 5 is a stage before bending and piercing which is processed at a later stage, it is smaller, in a size in the height direction than the press-finished product 6. For example, the height is 1/20. Accordingly, if the same packing height is provided, the maximum number of trimmed products 5 can be included in one package.

If the sub-component products_7 are packed as shown in the step (9), they can be integrally stored by welding or combination storage. Accordingly, it is not necessary to separately store these other parts and such a storing method is favorable especially when the number of components are many. In this case, each size in the vertical (y) and horizontal (s) directions is close to X, Y in a packing style for the finished products 1. The semi-finished products put on top of each other by the step (8) or (9) are included in one package in a step (10) to provide a collective packing style for collective storage 10. The size of this collective packing style 10 can be substantially the same extent as X, Y and H in the packing style for the finished products 1. It is also possible to store the parts in the condition of press-finished products collectively and intensively.

As shown in the lower section of FIG. 1, the collective packing style for collective storage 10 is stored every package in a storage-rack 2. Even though the entire storage-rack is almost the same size as before, the storage quantity is remarkably increased, for example, three to five times larger than the case where, as shown in the upper section of FIG. 1, only one finished product is included in a conventional package. Namely, even though the collective packing style for collective storage 10 is made in almost the same size as X, Y and H of the packing style for the finished product 1, quantity of contents obviously increases.

Figure 3:
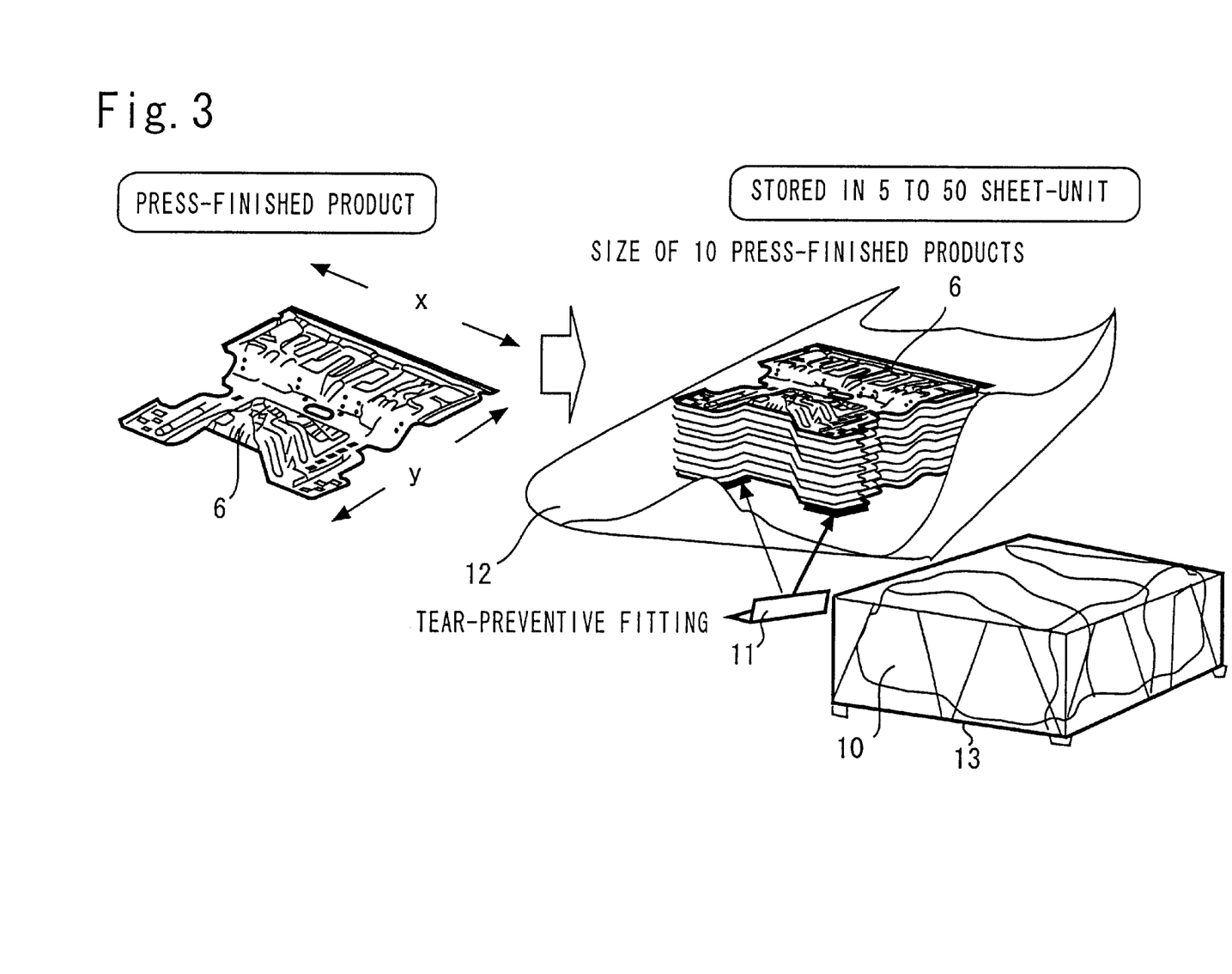
FIG. 3 is a view showing a packing method.

FIG. 3 shows a packing example for collectively storing the press-finished product 6 in which 5 to 50 pcs of the pre-finished products 6 are put on top of each other and tear-preventive fittings 11 made of known selective cushioning material such as foamed material are provided at corner sections. The press-finished products 6 are then enclosed by a rust-preventive sheet 12 made of suitable rust-preventive material such as vinyl. Then, the periphery of the products 6 is further enclosed by a frame 13 of wire rods to provide a collective packing style for collective storage 10 which serves as one package. This collective packing style for collective storage 10 is formed as a conveyance form unit which can be lifted up and down by a forklift truck etc. and the frame 13 is also provided with strength to stand such a conveyance.

Figure 4:
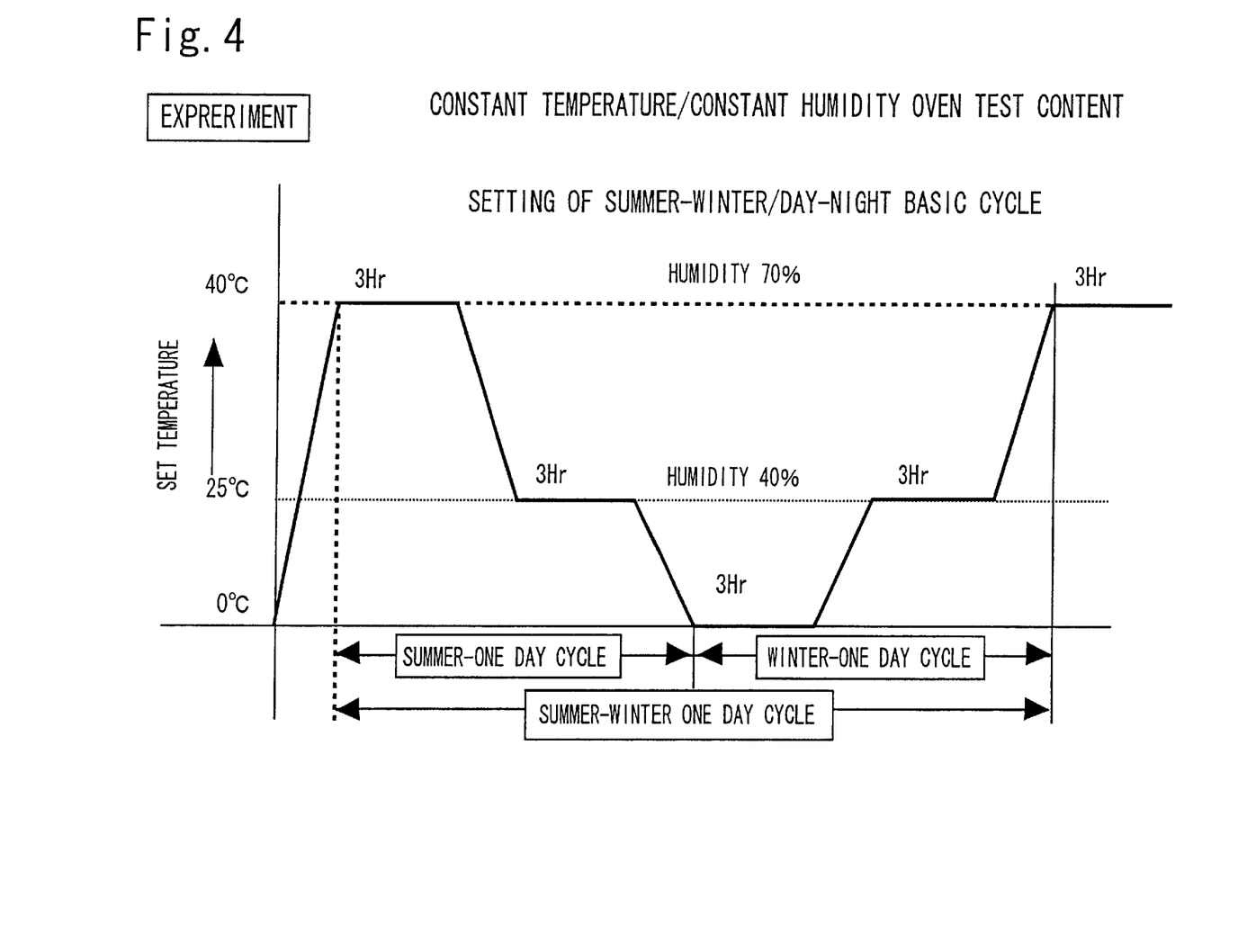
FIG. 4 is a view showing a rust-preventive test method.

Packing by the rust-preventive sheet 12 is required to exhibit a predetermined rust-prevention so that the semi-finished products that are the contents are kept free of rust for a long time. FIG. 4 illustrates a rust-preventive test method in which the rust-prevention is judged by a constant temperature and constant humidity oven test by a predetermined summer and winter one-day cycle. In this test, the summer and winder one-day cycle is repeated predetermined times. For example, based on 10 cycles per annum, this is repeated for 5 to 10 years of the number of storage target years. If no rust is generated, it is considered as "passed the test".

The one-day cycle of summer day forming summer and winter one-day cycle is three (3) hours in temperature 40° C. and humidity 70%, and three (3) hours in temperature 25° C. and humidity 40%, and then temperature is decreased to 0° C. In the case of winter one-day cycle, temperature 0° C. is first maintained for three (3) hours, then, temperature 25° C. and humidity 40% are maintained for three (3) hours and it is increased to temperature 40° C. and humidity 70%. Time to which the first one-day cycle of summer day is started is set as rise time (e.g., one hour).

Figure 5:
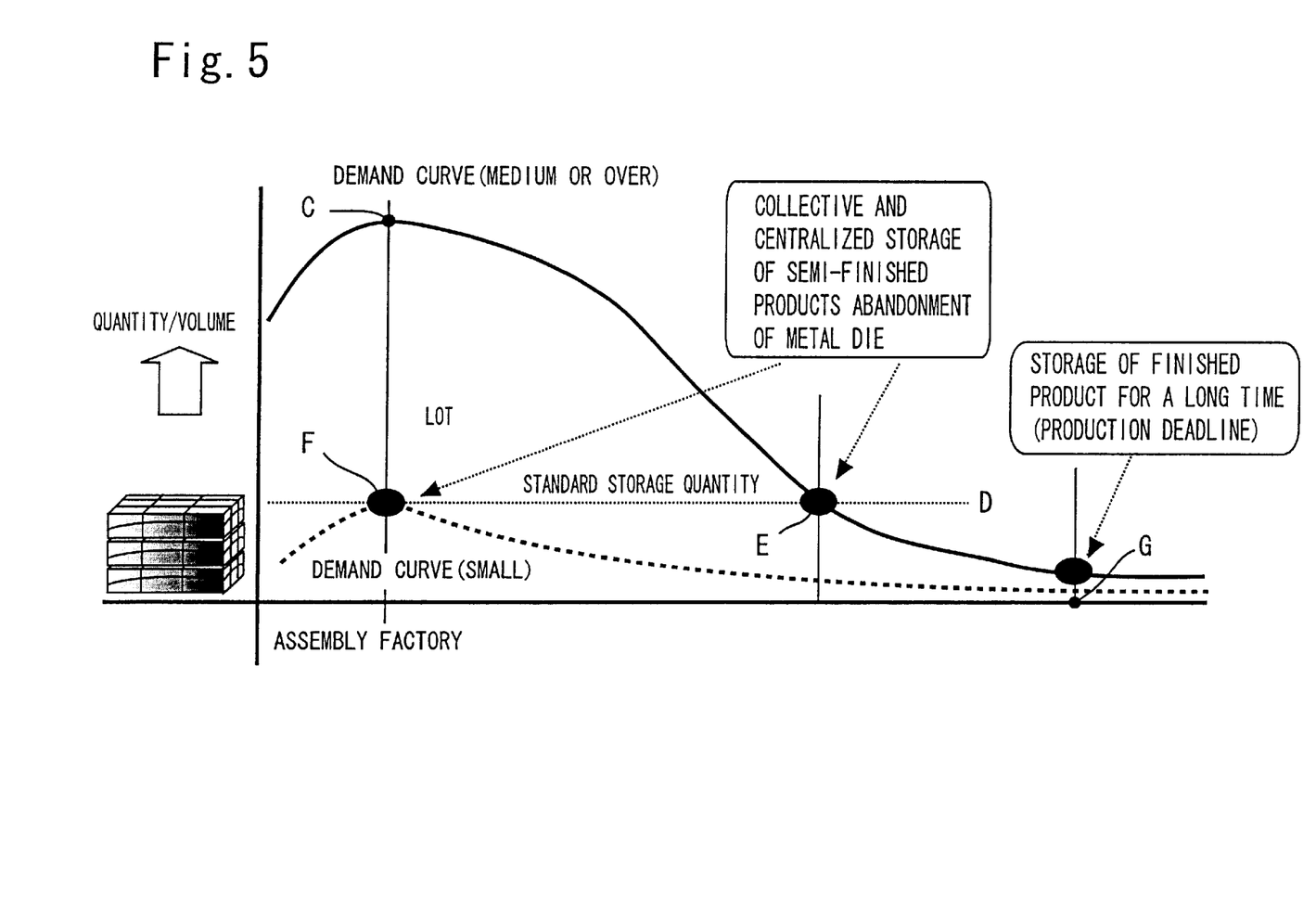
FIG. 5 is a view showing the timing for determining a predetermined number of demand.

FIG. 5 is a view showing timing setting for the collective storage according to the present invention in which curved lines are demand curves showing demand quantity of sheet metal repair parts which is expected to require for a certain period of time (e.g., year, month, etc.). The horizontal axis shows a period of time and the vertical axis shows forecasted demand quantity of the sheet metal repair parts. The demand curve goes up after an automobile is put on the market and reaches its peak C, then starts to gradually go down. This demand curve is determined based on a rule of thumb. A solid line of the demand curves shows a case where there is a demand of a medium level or more, while a broken line shows a case where there is a small demand.

When a certain period of time passes after the demand curve passes its peak C, the demand curve intersects a standard storage quantity line D at a point E. In the case where there is a demand of a medium level or more as shown in the solid line during the period to a point E, a metal die is kept to supply the sheet metal repair parts by job-lot manufacturing. As shown by the broken line, when the entire level is below the standard storage quantity line D, the sheet metal repair parts are collectively stored as described later.

The standard storage quantity line D is set as a line whereby cubic content of the collective stock storage quantity at a point E coincides with that of the metal die and corresponds to a predetermined set value in the present invention. The collective stock storage quantity is the quantity obtained by integrating the demand curve till an inventory deadline after a point E.

When the demand curve in the solid line intersects the standard storage quantity line D at a point E, the forecasted total quantity to be stored after that point is manufactured in a condition of the semi-finished product before the metal is abandoned. The collective storage by the semi-finished products are then started and stored until the predetermined storage deadline. A point G is a part supply deadline which does not have any specific meaning as far as the metal die storage in the present embodiment is concerned, but the metal die had to be stored until the predetermined part supply deadline longer than this point G in the past.

As shown by the broken line, in the case of a product of a demand curve with less demand, when the demand curve coincides with the standard storage quantity line D at its peak F which is quite faster than a point E, the collective storage by the half-finished product is started at this point F. The half-finished products are then stored for a predetermined period of time.

Operation of the present embodiment will now be described. As described above, when the forecasted demand quantity reaches the predetermined set value D, the sheet metal repair parts are collectively manufactured as the half-finished product (5, 6, or 7). A plurality of sheet metal parts are handled as one unit and packed and stored as the collective style of packing for collective storage 10. In this manner, a storage space can be remarkably reduced. Since the metal die is abandoned at the same time, the storage of the metal die for a long time is not needed any more and thus, it is possible to avoid the increase in costs.

The collectively stored semi-finished product (5, 6 or 7) can be given additional processes depending on the demand to provide a finished product and supplied in the necessary quantity. In this case, since the semi-finished product (5, 6 or 7) is in the pre-coating stage, it can be provided with necessary color coating depending on the demand. Even though there is any difference in the demand quantity every color, it is possible to flexibly cope with such a change. It is also possible to keep painting of the semi-finished product during storage free from any damage. When the storage term expires, any stock can be abandoned in the semi-finished condition and costs resulting from abandonment can be saved because the processes to the finished product are omitted.

Further, the predetermined set value D in the forecasted demand quantity is the value whereby packing volume of the half-finished product (5, 6 or 7) to be collectively stored coincides with the cubic volume of the metal die. Accordingly, even though the semi-finished product is stored for a long time after that, the metal die is abandoned so that the storage space thereof can be used for the semi-finished product. It is therefore possible to minimize the storage space and to make the stock storage of the sheet metal repair parts for a long time advantageous.

The semi-finished product to be stocked can be either of the trimmed product 5 during pressing, pressed product 6 or the sub-component product 7 obtained by welding other parts to the pressed product 6. In the case of the trimmed product 5, it is possible to make the storage space minimal because the cubic volume per piece is minimal. In the case of pressed product 6, the cubic volume is larger than the trimmed product 5, but since a process requiring a large-sized pressing machine is completed, a mobile processing is possible because the processing place is not limited. In the case of the sub-component product 7, the cubic volume becomes the largest, but since other assembled parts can be integrally provided, it is no more necessary to stock these assembled parts (including the metal die for these depending the case) separately. As a result, it is advantageous in the part management or stock storage.

Figure 6:
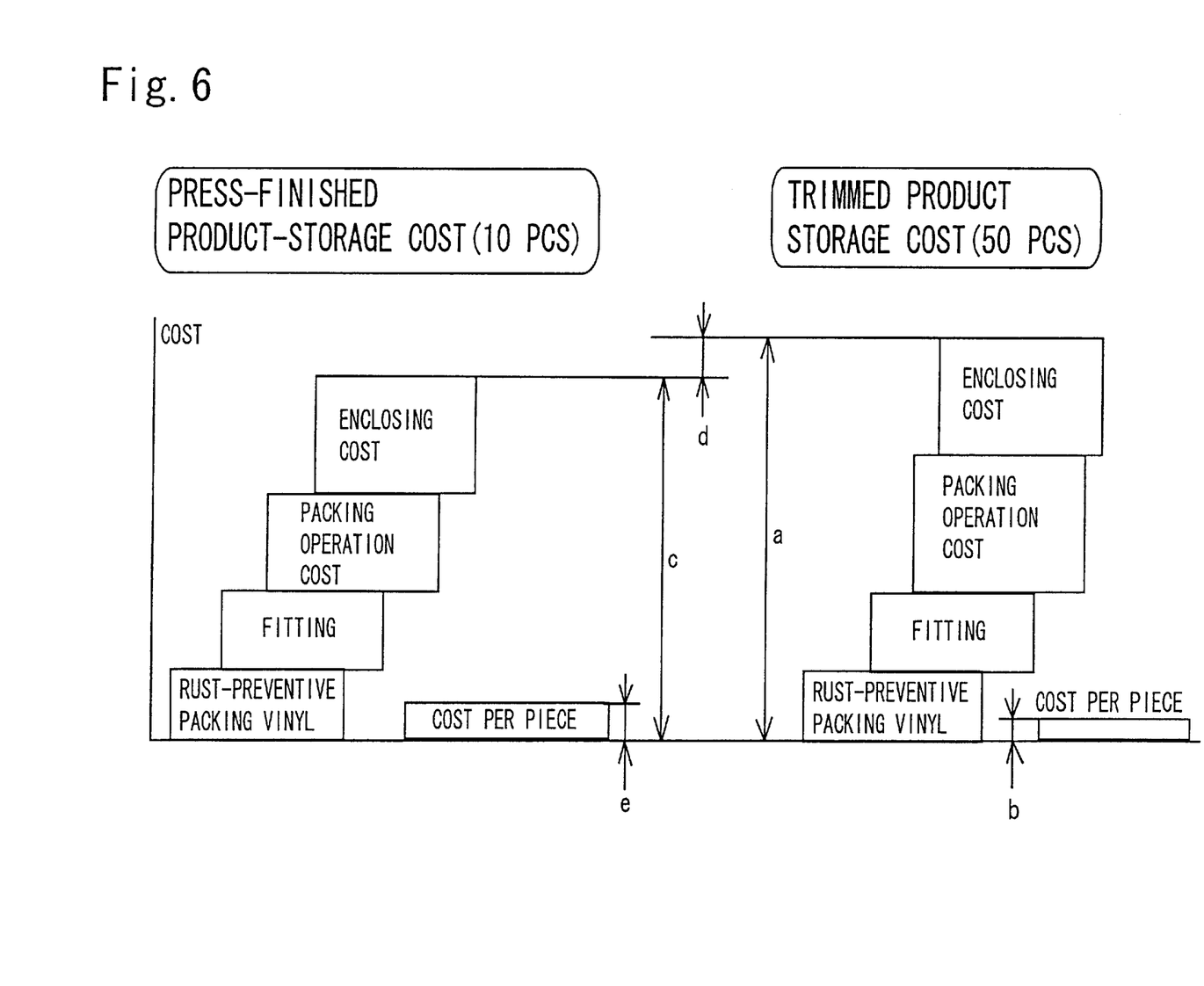
FIG. 6 is a cost comparison view by the style of packing.

FIG. 6 is a cost comparison view by a storage method of the processes (8) and (9). First, when the trimmed product 5 is stored, 50 pcs of trimmed products 5 are housed in one package. When the total cost is a and the cost per piece is b, the total cost a is higher than the total cost c of sub-component product 7 in which 10 pcs of sub-component products are housed in one package by d. However, the cost e of the sub-component product per piece is much higher than the cost b of the trimmed product 5. Accordingly, as far as the cost is concerned, it is more advantageous to store the semi-finished product in the condition of the trimmed product 5 than in the sub-component product 7. The same result can be obtained even though the pressed product is used in place of the sub-component product 7.

What is claimed is:

1. A collective and centralized inventory storing method of sheet metal parts for repairing in which the sheet metal parts are manufactured from sheet-shaped members through each process of drawing, press working, welding and coating, the storing method comprising the step of:

determining whether or not a forecasted number of demand is lower than a predetermined set value, and if the forecasted number of demand is determined to be lower than the predetermined set value, the method comprising the additional steps of:

collectively enclosing a plurality of sheet metal parts in a rust-preventive sheet in a semi-finished product condition at least before coating;

storing the enclosed plurality of sheet metal parts as one package; and abandoning a metal die; and if the forecasted number of demand is determined to be higher than the predetermined set value, the method comprising the additional step of keeping the metal die, wherein the predetermined set value in the forecasted number of demand is the value where packing volume of the semi-finished product to be stored coincides with a cubic volume of the metal die, and is the value where an amount for storing the packed parts coincides with an amount for storing the metal die.

2. The collective and centralized inventory storing method of sheet metal parts for repairing according to claim 1, wherein the semi-finished product to be stocked is a trimmed product in a middle of the press working process.

3. The collective and centralized inventory storing method of sheet metal parts for repairing according to claim 1, wherein the semi-finished product to be stocked is a press-finished product.

4. The collective and centralized inventory storing method of sheet metal parts for repairing according to claim 1, wherein the semi-finished product to be stocked is a sub-component product obtained by welding other parts to the press finished product.

5. The collective and centralized inventory storing method of sheet metal parts for repairing according to claim 1, wherein the metal parts enclosed in the rust-preventive sheet are further enclosed by a frame of wire rods to provide a collective packing style for collective storage which serves as one package.

6. The collective and centralized inventory storing method of sheet metal parts for repairing according to claim 5, wherein the frame of wire rods provide the collective packing style with a strength to be lifted up and down by a forklift truck.

* * * * *